(12) United States Patent
Ren et al.

(10) Patent No.: US 7,487,497 B2
(45) Date of Patent: Feb. 3, 2009

(54) METHOD AND SYSTEM FOR AUTO PARALLELIZATION OF ZERO-TRIP LOOPS THROUGH INDUCTION VARIABLE SUBSTITUTION

(75) Inventors: Zhixing Ren, Waterloo (CA); Raul Esteban Silvera, Woodbridge (CA); Guansong Zhang, Toronto (CA)

(73) Assignee: International Business Machines Corporation, Armonk, NY (US)

(*) Notice: Subject to any disclaimer, the term of this patent is extended or adjusted under 35 U.S.C. 154(b) by 850 days.

(21) Appl. No.: 10/926,594

(22) Filed: Aug. 26, 2004

(65) Prior Publication Data

US 2006/0048119 A1 Mar. 2, 2006

(51) Int. Cl.
*G06F 9/45* (2006.01)
(52) U.S. Cl. ...................... 717/150; 717/160
(58) Field of Classification Search .............. 717/124, 717/150, 160, 161, 149, 159; 712/221
See application file for complete search history.

(56) References Cited

U.S. PATENT DOCUMENTS

| | | | | |
|---|---|---|---|---|
| 4,833,606 | A | 5/1989 | Iwasawa et al. | 364/300 |
| 5,349,665 | A | 9/1994 | Endo | 395/700 |
| 6,192,515 | B1 | 2/2001 | Doshi et al. | 717/9 |
| 6,253,371 | B1* | 6/2001 | Iwasawa et al. | 717/150 |
| 6,282,704 | B1 | 8/2001 | Iitsuka | 717/6 |
| 6,343,375 | B1 | 1/2002 | Gupta et al. | 717/9 |
| 6,367,071 | B1* | 4/2002 | Cao et al. | 717/160 |
| 6,588,009 | B1* | 7/2003 | Guffens et al. | 717/161 |
| 6,708,325 | B2* | 3/2004 | Cooke et al. | 717/124 |
| 2002/0199177 | A1 | 12/2002 | Ogawa et al. | 717/149 |
| 2007/0050603 | A1* | 3/2007 | Vorbach et al. | 712/221 |

FOREIGN PATENT DOCUMENTS

JP 09-319591 12/1997

OTHER PUBLICATIONS

Pottenger "Induction Variable Substitution and Reduction Recognition in the Polaris Parallelizing Compiler", 1995, Master of Science Thesis in Computer Science, University of Illinois at Urbana-Champaign.*
Pottenger et al. "Idiom Recognition in the Polaris Parallelizing Compiler", 1995, Proceedings of the 9th International Conference on Supercomputing, pp. 444-448.*

* cited by examiner

*Primary Examiner*—Lewis A. Bullock, Jr.
*Assistant Examiner*—Jue S Wang
(74) *Attorney, Agent, or Firm*—Duke W. Yee; Matthew Talpis; Theodore D. Fay, III

(57) ABSTRACT

A method and system of auto parallelization of zero-trip loops that substitutes a nested basic linear induction variable by exploiting a parallelizing compiler is provided. Provided is a use of a max$\{0,N\}$ variable for loop iterations in case of no information is known about the value of N, for a typical loop iterating from 1 to N, in which N is the loop invariant. For the nested basic induction variables, an induction variable substitution process is applied to the nested loops starting from the innermost loop to the outermost one. Then a removal of the max operator afterwards through a copy propagation pass of the IBM compiler is provided. In doing so, the loop dependency on the induction variable is eliminated and an opportunity for a parallelizing compiler to parallel the outermost loop is provided.

8 Claims, 2 Drawing Sheets

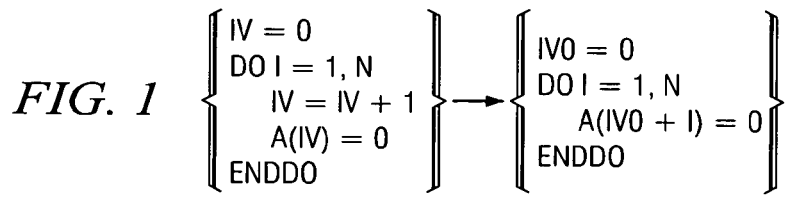
FIG. 1
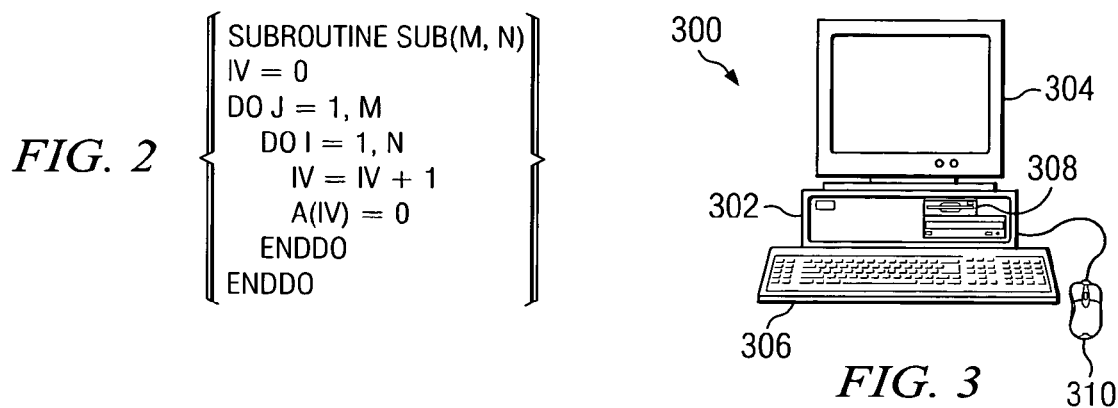
FIG. 2
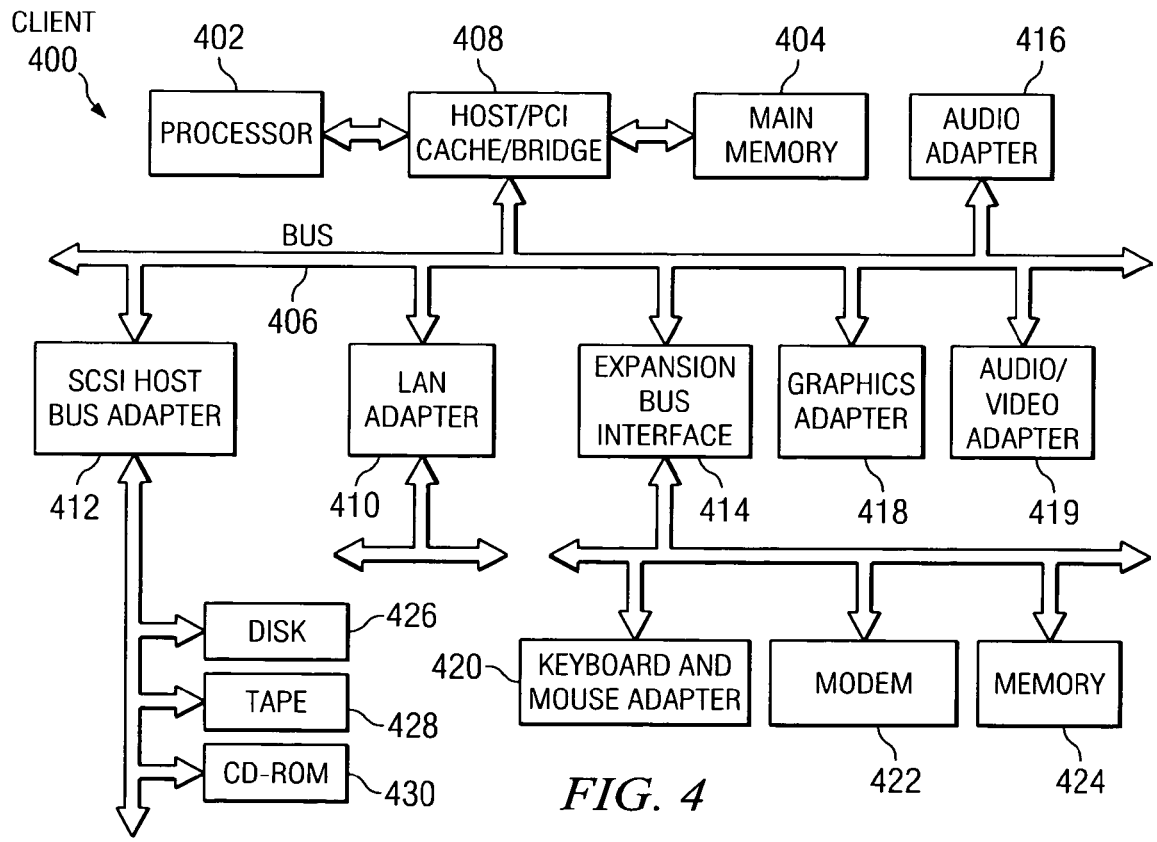
FIG. 3
FIG. 4

FIG. 5

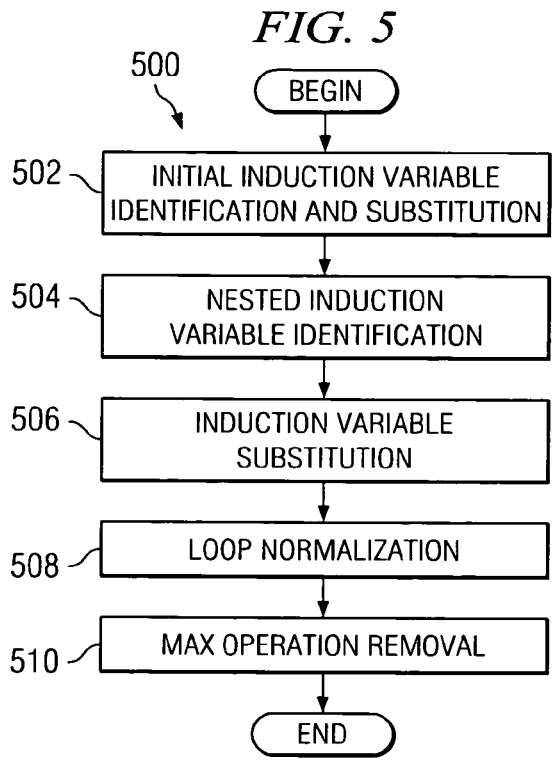

500

BEGIN

502 — INITIAL INDUCTION VARIABLE IDENTIFICATION AND SUBSTITUTION

504 — NESTED INDUCTION VARIABLE IDENTIFICATION

506 — INDUCTION VARIABLE SUBSTITUTION

508 — LOOP NORMALIZATION

510 — MAX OPERATION REMOVAL

END

FIG. 6

```
SUBROUTINE SUB(M, N)
IV = 0
DO J = 1, M
BUMP = max(0, N)
   DO I = 1, N
      IV = I + (J - 1) * BUMP
      A(IV) = 0
   ENDDO
ENDDO
```

FIG. 7

```
SUBROUTINE SUB(M, N)
IV = 0
DO J = 1, M
   DO I = 1, N
      A(I + (J - 1) * max(0, N)) = 0
   ENDDO
ENDDO
```

FIG. 8

```
SUBROUTINE SUB(M, N)
IV = 0
DO J = 1, M
BUMP = max(0, N)
   IF (N <= 0) GOTO LAB_1
   DO I = 1, N
      IV = I + (J - 1) * BUMP
      A(IV) = 0
   ENDDO
      LAB_1
         CONTINUE
ENDDO
IV = M * max(0, N)
```

FIG. 9

```
SUBROUTINE SUB(M, N)
IV = 0
DO J = 1, M
   IF (N <= 0) GOTO LAB_1
   DO I = 1, N
      A(I + (J - 1) * N) = 0
   ENDDO
      LAB_1
         CONTINUE
ENDDO
IV = M * max(0, N)
```

METHOD AND SYSTEM FOR AUTO PARALLELIZATION OF ZERO-TRIP LOOPS THROUGH INDUCTION VARIABLE SUBSTITUTION

BACKGROUND OF THE INVENTION

1. Technical Field

The present invention relates to code optimization. In particular, the present invention relates to code optimization through auto parallelization of zero-trip loops.

2. Description of Related Art

A basic induction variable is a variable that is only determined inside a loop, whose value is incremented or decremented by a constant value. The most common place to find the use of induction variables is in array subscripts. Induction variable substitution finds variables which form arithmetic and geometric progressions and which can be expressed as functions of the indices of enclosing loops, then replaces these variables with the expressions involving loop indices. Induction variable substitution plays a very important role in resolving data dependencies and enabling loop parallelization. Loop parallelization by a compiler attempts to parallelize loops to speed up execution. Parallelizing is to generate instructions for a parallel processing computer. For example, the code segment in the left side of the example depicted in FIG. 1, which demonstrates an induction variable substitution, cannot be parallelized due to the loop carried dependency on induction variable (IV). Induction variable substitution is used to solve this problem. After induction variable substitution, the dependency would be eliminated and the loop can be parallelized as shown in the right side of the example depicted in FIG. 1.

For the nested induction variables, the substitution can be processed recursively starting from the innermost loop. A zero-trip loop is a loop that, depending on the values of the starting value and the limit, it is possible to 'skip' the loop entirely. In case of zero-trip loop, the number of iterations calculated from the parameters of the loop is less than 1 and the simple substitution would cause a problem. Take the exemplary Fortran code segment in FIG. 2, which is a zero-trip loop code. Applying substitution to the nested induction variable IV in the code of FIG. 1, the variable IV would be expressed as: $IV=I+J*N$ if the value of N is positive. However, if N is non-positive, the result of the substitution would be incorrect.

SUMMARY OF THE INVENTION

The present invention provides a method of auto parallelization of zero-trip loops. The present invention substitutes a nested basic linear induction variable by exploiting a parallelizing compiler. For a typical loop iterating from 1 to N, in which N is the loop invariant, the present invention uses $\max\{0,N\}$ as the loop iterations in the case of no information being known about the value of N. For the nested induction variables, the present invention applies the induction variable substitution process to the nested loops starting from the innermost loop to the outermost one. The present invention provides for removing the max operator afterwards through a copy propagation pass of the IBM compiler. In doing so, the present invention eliminates loop dependency on the induction variable and provides an opportunity for a parallelizing compiler to parallel the outermost loop.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a diagram illustrating the concept of induction variable substitution;

FIG. 2 is a diagram illustrating a zero-trip loop code;

FIG. 3 is a pictorial representation of a data processing system in which the present invention may be implemented in accordance with a preferred embodiment of the present invention;

FIG. 4 is a block diagram of a data processing system in which the present invention may be implemented;

FIG. 5 is a high-level flow diagram illustrating the nested basic induction variable substitution process in accordance with a preferred embodiment of the present invention;

FIG. 6 is a diagram illustrating code after an induction variable IV is substituted in accordance with a preferred embodiment of the present invention;

FIG. 7 is a diagram illustrating code after dead store and copy propagation passes are performed in accordance with a preferred embodiment of the present invention;

FIG. 8 is a diagram illustrating code after a loop normalization phase in accordance with a preferred embodiment of the present invention; and FIG. 9 is a diagram illustrating the transformations after the induction variable substitution in accordance with a preferred embodiment of the present invention.

DETAILED DESCRIPTION OF THE PREFERRED EMBODIMENT

With reference now to the figures and in particular with reference to FIG. 3, a pictorial representation of a data processing system in which the present invention may be implemented is depicted in accordance with a preferred embodiment of the present invention. A computer 300 is depicted which includes system unit 302, video display terminal 304, keyboard 306, storage devices 308, which may include floppy drives and other types of permanent and removable storage media, and mouse 310. Additional input devices may be included with personal computer 300, such as, for example, a joystick, touchpad, touch screen, trackball, microphone, and the like. Computer 300 can be implemented using any suitable computer, such as an IBM eServer™ computer or IntelliStation® computer, which are products of International Business Machines Corporation, located in Armonk, N.Y. Although the depicted representation shows a computer, other embodiments of the present invention may be implemented in other types of data processing systems, such as a network computer. Computer 300 also preferably includes a graphical user interface (GUI) that may be implemented by means of systems software residing in computer readable media in operation within computer 300.

With reference now to FIG. 4, a block diagram of a data processing system is shown in which the present invention may be implemented. Data processing system 400 is an example of a computer, such as computer 300 in FIG. 3, in which code or instructions implementing the processes of the present invention may be located. Data processing system 400 employs a peripheral component interconnect (PCI) local bus architecture. Although the depicted example employs a PCI bus, other bus architectures such as Accelerated Graphics Port (AGP) and Industry Standard Architecture (ISA) may be used. Processor 402 and main memory 404 are connected to PCI local bus 406 through PCI bridge 408. PCI bridge 408 also may include an integrated memory controller and cache memory for processor 402. Additional connections to PCI local bus 406 may be made through direct component interconnection or through add-in connectors.

In the depicted example, local area network (LAN) adapter 410, small computer system interface SCSI host bus adapter 412, and expansion bus interface 414 are connected to PCI local bus 406 by direct component connection. In contrast, audio adapter 416, graphics adapter 418, and audio/video adapter 419 are connected to PCI local bus 406 by add-in boards inserted into expansion slots. Expansion bus interface 414 provides a connection for a keyboard and mouse adapter 420, modem 422, and additional memory 424. SCSI host bus adapter 412 provides a connection for hard disk drive 426, tape drive 428, and CD-ROM drive 430. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system such as Windows XP™, which is available from Microsoft Corporation. An object oriented programming system, such as the Java™ programming system, may run in conjunction with the operating system and provides calls to the operating system from Java programs or applications executing on data processing system 400. "JAVA" is a trademark of Sun Microsystems, Inc. Instructions for the operating system, the object-oriented programming system, and applications or programs are located on storage devices, such as hard disk drive 426, and may be loaded into main memory 404 for execution by processor 402.

Those of ordinary skill in the art will appreciate that the hardware in FIG. 4 may vary depending on the implementation. Other internal hardware or peripheral devices, such as flash read-only memory (ROM), equivalent nonvolatile memory, or optical disk drives and the like, may be used in addition to or in place of the hardware depicted in FIG. 4. Also, the processes of the present invention may be applied to a multiprocessor data processing system.

For example, data processing system 400, if optionally configured as a network computer, may not include SCSI host bus adapter 412, hard disk drive 426, tape drive 428, and CD-ROM 430. In that case, the computer, to be properly called a client computer, includes some type of network communication interface, such as LAN adapter 410, modem 422, or the like. As another example, data processing system 400 may be a stand-alone system configured to be bootable without relying on some type of network communication interface, whether or not data processing system 400 comprises some type of network communication interface. As a further example, data processing system 400 may be a personal digital assistant (PDA), which is configured with ROM and/or flash ROM to provide non-volatile memory for storing operating system files and/or user-generated data.

The depicted example in FIG. 4 and above-described examples are not meant to imply architectural limitations. For example, data processing system 400 also may be a notebook computer or hand held computer in addition to taking the form of a PDA. Data processing system 400 also may be a kiosk or a Web appliance.

The processes of the present invention are performed by processor 402 using computer implemented instructions, which may be located in a memory such as, for example, main memory 404, memory 424, or in one or more peripheral devices 426-430.

The present invention provides a method of auto parallelization of zero-trip loops. The present invention substitutes a nested basic linear induction variable by exploiting a parallelizing compiler. For a typical loop iterating from 1 to N, in which N is the loop invariant, the present invention uses $\max\{0,N\}$ as the loop iterations in case of no information is known about the value of N. For the nested induction variables, the present invention applies the induction variable substitution process to the nested loops starting from the innermost loop to the outermost loop. The present invention provides for removing the max operator afterwards through a copy propagation pass of the IBM compiler. In doing so, the present invention eliminates loop dependency on the induction variable and provides an opportunity for a parallelizing compiler to parallel the outermost loop.

Turning now to FIG. 5, a high-level flow diagram 500 illustrating the nested basic induction variable substitution process is depicted in accordance with a preferred embodiment of the present invention. Initial induction variable identification and substitution is conducted through a pass in the IBM compiler (block 502). After the basic induction variables are detected based on static single assignment (SSA), a test is performed to test whether the initial induction variable identified are nested basic induction variables for the outer loops (block 504). In order to identify whether the initial induction variable is a nested basic induction variable for the outer loop, it must satisfy specific conditions. Those conditions being no definitions of the induction variable in the parent loop, the inner loop's body is enclosed by the outer loop, and there is no branch that goes out of or comes into the outer loop.

If a nested basic induction variable is identified (block 504), then a nested basic induction variable substitution is performed (block 506). Using the zero-trip loop code segment of FIG. 2 as an example, FIG. 6 is the code after the induction variable IV is substituted. Note that an extra temporary variable BUMP is added before the inner loop, which represents the value of the induction variable bump. Then after dead store and copy propagation passes, the code will be transformed to the code as shown in FIG. 7.

After the nested basic induction variable substitution is performed, loop normalization is performed (block 508). The code segment in FIG. 7 will look like FIG. 8 after the loop normalization phase. From FIG. 8 we can see that the value of BUMP is always positive within the IF branch. Hence, during the copy propagation pass, the value of BUMP is copied inside the IF branch without the max operator and in the following dead store removal pass, the definition of IV can be eliminated. Finally, the loop dependency in the induction variable is eliminated through the adding and removal of the max operator to the unknown loop count within the nested loops (block 510). FIG. 9 is the final look of the transformations of the code shown in FIG. 2.

In summary, the present invention provides a method of auto parallelization of zero-trip loops. The present invention substitutes a nested basic linear induction variable by exploiting a parallelizing compiler. For a typical loop iterating from 1 to N, in which N is the loop invariant, the present invention uses $\max\{0,N\}$ as the loop iterations in case of no information is known about the value of N. For the nested induction variables, the present invention applies the induction variable substitution process to the nested loops starting from the innermost loop to the outermost one. The present invention provides for removing the max operator afterwards through a copy propagation pass of the IBM compiler. In doing so, the present invention eliminates loop dependency on the induction variable and provides an opportunity for a parallelizing compiler to parallel the outermost loop.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for auto parallelization of zero-trip loops through induction variable substitution, the method comprising:
    detecting basic induction variables in an inner loop;
    identifying nested induction variables within the basic induction variables for an outer loop;
    substituting an induction variable in the inner loop for the nested induction variables of the outer loop, wherein substituting comprises adding a max operator;
    performing loop normalization; and
    thereafter removing the max operator, wherein removing eliminates loop dependencies on the induction variable.

2. The method of claim 1, further comprising:
    performing loop normalization of the outer loop; and
    removing the induction variable from the outer loop.

3. The method of claim 1, further comprising:
    substituting at least one additional induction variable in the inner loop for the nested induction variables of an intermediate loop.

4. The method of claim 3, further comprising:
    performing loop normalization of the intermediate loop; and
    removing the at least one additional induction variable from the intermediate loop.

5. The method of claim 1, wherein identifying nested induction variables within the detected basic induction variables for an outer loop further includes:
    certifying that no definitions of the induction variable are in a parent loop;
    verifying that the inner loops body is enclosed by the outer loop; and
    ensuring that no branch goes out of or comes into the outer loop.

6. The method of claim 1, wherein substituting an induction variable in the inner loop for the nested induction variables of the outer loop further includes:
    performing a dead store and copy propagation process.

7. The method of claim 1 wherein removing is performed through a copy propagation pass of a compiler.

8. A method in a data processing system for auto parallelization of zero-trip loops through induction variable substitution, the method comprising:
    detecting basic induction variables in an inner loop;
    identifying nested induction variables within the detected basic induction variables for an outer loop, wherein identifying nested induction variables within the detected basic induction variables for an outer loop includes:
        certifying that no definitions of the induction variable are in a parent loop;
        verifying that the inner loops body is enclosed by the outer loop; and
        ensuring that no branch goes out of or comes into the outer loop;
    substituting an induction variable in the inner loop for the nested induction variables of the outer loop, wherein substituting an induction variable in the inner loop for the nested induction variables of the outer loop includes:
        performing a dead store and copy propagation process; and
        adding a max operator;
    performing loop normalization of the outer loop;
    removing the induction variable from the outer loop;
    substituting at least one additional induction variable in the inner loop for the nested induction variables of an intermediate loop;
    performing loop normalization of the intermediate loop;
    removing the at least one additional induction variable from the intermediate loop; and
    removing the max operator through a copy propagation pass of a compiler.

* * * * *